United States Patent
Ryu et al.

(10) Patent No.: US 8,846,243 B2
(45) Date of Patent: Sep. 30, 2014

(54) ELECTRODE ASSEMBLY HAVING ELECTRODE TABS OF THE SAME SIZE IN JOINT PORTION THEREOF AND ELECTROCHEMICAL CELL CONTAINING THE SAME

(75) Inventors: Ji Heon Ryu, Seoul (KR); Eun Ju Lee, Dajeon (KR); Jeong Hee Choi, Busan (KR); Youngjoon Shin, Dajeon (KR)

(73) Assignee: LG Chem, Ltd. (KR)

( * ) Notice: Subject to any disclaimer, the term of this patent is extended or adjusted under 35 U.S.C. 154(b) by 237 days.

(21) Appl. No.: 12/309,548

(22) PCT Filed: Jul. 14, 2007

(86) PCT No.: PCT/KR2007/003411
§ 371 (c)(1),
(2), (4) Date: Sep. 4, 2009

(87) PCT Pub. No.: WO2008/013371
PCT Pub. Date: Jan. 31, 2008

(65) Prior Publication Data
US 2010/0028770 A1    Feb. 4, 2010

(30) Foreign Application Priority Data

Jul. 24, 2006    (KR) .................. 10-2006-0068823

(51) Int. Cl.
*H01M 6/12*    (2006.01)
(52) U.S. Cl.
USPC .......................................... 429/162
(58) Field of Classification Search
None
See application file for complete search history.

(56) References Cited

U.S. PATENT DOCUMENTS

| 4,098,966 | A | * | 7/1978 | Brown ......................... 429/161 |
| 6,423,442 | B1 | | 7/2002 | Hallifax et al. |
| 6,617,074 | B1 | * | 9/2003 | Watarai et al. ........... 429/231.95 |
| 6,849,358 | B2 | | 2/2005 | O'Connell |
| 2004/0038122 | A1 | * | 2/2004 | Hisamitsu et al. ............. 429/120 |
| 2004/0038124 | A1 | * | 2/2004 | Hisamitsu et al. ............. 429/162 |
| 2004/0106038 | A1 | * | 6/2004 | Shimamura et al. .......... 429/152 |
| 2007/0117020 | A1 | * | 5/2007 | Baker et al. ................... 429/234 |

FOREIGN PATENT DOCUMENTS

| JP | 1995-052827 A | 2/1995 |
| JP | 1996-250103 | 9/1996 |
| JP | 1997-334179 | 6/1999 |
| JP | 1999-167913 | 6/1999 |
| JP | 2003-123743 A | 4/2003 |
| KR | 2003-0095519 A | 12/2003 |
| KR | 20080021271 A | 3/2008 |

OTHER PUBLICATIONS

Office Action from Korean Patent Application No. 10-2006-0068823 issued Jan. 19, 20100.

* cited by examiner

*Primary Examiner* — Cynthia K. Walls
(74) *Attorney, Agent, or Firm* — Lerner, David, Littenberg, Krumholz & Mentlik, LLP

(57) ABSTRACT

Disclosed herein is a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and protruding lengths of the electrode tabs are gradually increased according to the distances between the electrode leads and the electrode tabs, whereby the lengths of the electrode tabs at joint portions between the electrode tabs and the electrode leads are the same. Also disclosed is an electrochemical cell including the electrode assembly.

7 Claims, 2 Drawing Sheets

Prior Art

ELECTRODE ASSEMBLY HAVING ELECTRODE TABS OF THE SAME SIZE IN JOINT PORTION THEREOF AND ELECTROCHEMICAL CELL CONTAINING THE SAME

CROSS REFERENCE TO RELATED APPLICATIONS

The present application is a national phase entry under 35 U.S.C. §371 of International Application No. PCT/KR2007/003411, filed Jul. 14, 2007, published in English, which claims the benefit of Korean Patent Application No. KR10-2006-0068823, filed Jul. 24, 2006. The disclosures of said applications are incorporated by reference herein.

FIELD OF THE INVENTION

The present invention relates to an electrode assembly having electrode tabs of the same size in a joint portion thereof, and, more particularly, to a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and protruding lengths of the electrode tabs are gradually increased according to the distances between the electrode leads and the electrode tabs, whereby the lengths of the electrode tabs at joint portions between the electrode tabs and the electrode leads are the same.

BACKGROUND OF THE INVENTION

As mobile devices have been increasingly developed, and the demand for such mobile devices has increased, the demand for batteries has also sharply increased as an energy source for the mobile devices. Also, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and long-sheet type anodes are wound while separators are disposed respectively between the cathodes and the anodes, a stacking type structure in which pluralities of cathodes and anodes having a predetermined size are successively stacked while separators are disposed respectively between the cathodes and the anodes, or a stacking/folding type structure in which pluralities of cathodes and anodes having a predetermined size are successively stacked while separators are disposed respectively between the cathodes and the anodes to constitute a bi-cell or a full-cell, and then the bi-cell or the full-cell is wound.

FIG. 1 is a side view typically illustrating the general structure of a conventional representative stacking type electrode assembly.

Referring to FIG. 1, the stacking type electrode assembly 10 is constructed in a structure in which cathodes 20, each of which has a cathode active material 22 applied to the opposite major surfaces of a cathode current collector 21, and anodes 30, each of which has an anode active material 32 applied to the opposite major surfaces of an anode current collector 31, are sequentially stacked while separators 70 are disposed respectively between the cathodes 20 and the anodes 30.

From one-side ends of the cathode current collectors 21 and the anode current collectors 31 protrude pluralities of cathode tabs 41 and anode tabs 51, to which an active material is not applied, such that the cathode tabs 41 and the anode tabs 51 are electrically connected to a cathode lead 60 and an anode lead (not shown) constituting electrode terminals of a battery (not shown). The cathode tabs 41 and the anode tabs 51 are joined in a concentrated state, and are then connected to the cathode lead 60 and the anode lead, respectively. This structure is more clearly illustrated in FIG. 2, which is a partially enlarged view typically illustrating the joint portion between the cathode tabs and the cathode lead. FIG. 2 illustrates only the joint portion between the cathode tabs and the cathode lead for convenience of description, although this structure is also applied to the joint portion between the anode tabs and the anode lead.

Referring to FIG. 2, the cathode tabs 40 are brought into tight contact with each other in the direction indicated by an arrow, and are connected to the cathode lead 60. Specifically, the cathode tabs 40 are brought into tight contact with the cathode lead 60 adjacent to the lowermost cathode tab 42 such that the cathode tabs 40 are joined to each other with the smallest bending length. Consequently, the length difference occurs at a joint portion A of the cathode tabs 40 between the lowermost cathode tab 42, which is a short distance from the cathode lead 60, and the uppermost cathode tab 41, which is a long distance from the cathode lead 60, due to the distance difference between the cathode tabs 40 and the cathode lead 60. Of course, this length difference also occurs at a joint portion between the anode tabs and the anode lead.

Due to this structure, the areas where the electrode tabs are in contact with the electrode lead are different from each other at the joint portion between the electrode tabs and the electrode lead of the electrode assembly, with the result that the use of electrode leads having more than a necessary size is inevitable. This is because the size of the electrode lead is set based on the electrode tab having the largest contact area so as to fix the electrode tabs, the thickness of which is much less than the electrode lead. In addition, the structural stability of the electrode assembly having the above-described structure is lowered for this reason.

In order to solve the above-mentioned problem, there has been proposed a technology for joining electrode tabs, while the electrode tabs are in tight contact with each other in one direction, and uniformly cutting the electrode tabs using a cutter. When using this technology, however, burrs occur at the cut ends of the electrode tabs, when the electrode tabs are cut. In addition, it is necessary to additionally perform a cutting process.

On the other hand, it is possible to bend the end of the electrode lead to a predetermined angle, the short-distance electrode tab to a large angle, and the long-distance electrode tab to a small angle in order to reduce the length difference between the electrode tabs at the joint portion thereof. In this structure, however, the size of the joint portion between the electrode tabs and the electrode lead is increased due to the bending, with the result that the electrode assembly may move, when external impacts are applied to the electrode assembly, and therefore, a possibility of the occurrence of a short circuit is strong. Especially for a middle- or large-sized battery cell, the thickness of the electrode lead is approximately twice that of a small-sized battery cell, with the result that it is more difficult to apply the above-described structure.

Consequently, there is a high necessity for an electrode assembly having an improved structure in which the lengths of the electrode tabs at the joint portion thereof are the same while the bending of the electrode tabs is minimized.

SUMMARY OF THE INVENTION

Therefore, the present invention has been made to solve the above problems, and other technical problems that have yet to be resolved.

Specifically, it is an object of the present invention to provide an electrode assembly having a structure in which the lengths of electrode tabs at a joint portion between the electrode tabs and an electrode lead are the same while the bending of the electrode tabs is minimized.

It is another object of the present invention to provide an electrode assembly having a structure in which the joining between the electrode tabs and the electrode lead is stably performed while the size of the electrode lead is small.

It is a further object of the present invention to provide an electrochemical cell including the electrode assembly.

In accordance with one aspect of the present invention, the above and other objects can be accomplished by the provision of a stacking or stacking/folding type electrode assembly of a cathode/separator/anode structure, wherein the electrode assembly is constructed in a structure in which tabs (electrode tabs), having no active material applied thereto, protrude from electrode plates constituting the electrode assembly, electrode leads are located at one-side ends of the stacked electrode tabs such that the electrode leads are electrically connected to the electrode tabs, and protruding lengths of the electrode tabs are gradually increased according to the distances between the electrode leads and the electrode tabs, whereby the lengths of the electrode tabs at joint portions between the electrode tabs and the electrode leads are the same.

According to the present invention, the electrode leads are not particularly restricted so long as the electrode leads are made of a material that can be electrically connected to the electrode tabs. Preferably, the electrode leads are made of a metal plate. The metal plate may be selected from a group consisting of an aluminum plate, a copper plate, a nickel plate, a copper plate coated with nickel, and a SUS plate.

Also, the electrode leads are not particularly restricted so long as the electrode leads are constructed in a structure in which the electrode leads are easily connected to the electrode tabs. For example, the electrode leads may be formed in the shape of a straight line in vertical section, and the electrode leads are joined to the electrode tabs by welding. The electrode leads may be connected to the electrode tabs in various manners. Preferably, the electrode leads are more stably connected to the electrode tabs by welding. The welding may include ultrasonic welding, laser welding, and resistance welding.

In the present invention, the one-side end of the stacked electrode tabs, where each electrode lead is preferably located, means the upper-side end of the electrode tab located at the uppermost position in the direction in which the electrode tabs are stacked (the uppermost electrode tab) or the lower-side end of the electrode tab located at the lowermost position in the direction in which the electrode tabs are stacked (the lowermost electrode tab). Consequently, the direction in which the protruding lengths of the electrode tabs are increased may be changed depending upon which side end of the stacked electrode tabs each electrode lead is located at. For example, when each electrode lead is located at the upper-side end of the uppermost electrode tab, it is preferable that the protruding lengths of the electrode tabs be gradually increased from the uppermost electrode tab to the lowermost electrode tab.

In accordance with another aspect of the present invention, there is provided an electrochemical cell including the electrode assembly with the above-stated construction.

The electrochemical cell is one that provides electricity through an electrochemical reaction. For example, the electrochemical cell may be an electrochemical secondary battery or an electrochemical capacitor. Especially, the electrochemical cell is preferably applied to a lithium secondary battery.

The secondary battery includes an electrode assembly that can be charged and discharged. Preferably, the secondary battery is constructed in a structure in which an electrode assembly is mounted in a battery case made of a laminate sheet including a metal layer and a resin layer in a sealed state. The secondary battery with the above-described structure may be referred to as a pouch-shaped secondary battery.

Also, the secondary battery is preferably used as a unit cell for high-output, large-capacity battery packs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
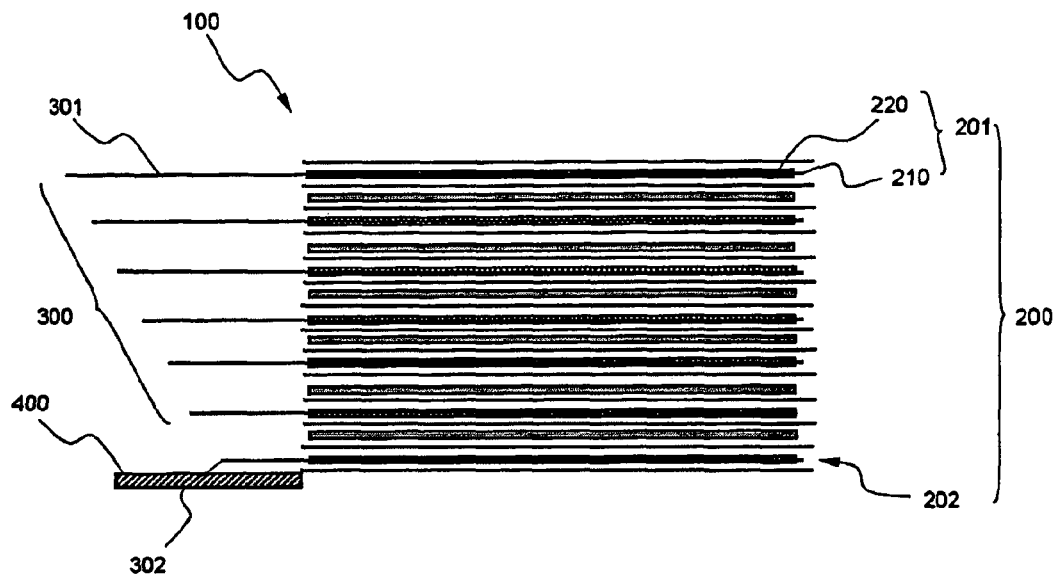
FIG. 3 is a typical view illustrating the structure of a stacking type electrode assembly according to a preferred embodiment of the present invention.

FIG. 3 is a typical view illustrating the structure of a stacking type electrode assembly according to a preferred embodiment of the present invention. The electrode assembly of FIG. 3 is approximately identical to the conventional electrode assembly, which is being generally used, and therefore, only the characteristics of the present invention will be described hereinafter. FIG. 3 illustrates only cathode tabs for convenience of description, although this structure is also applied to anode tabs.

Referring to FIG. 3, the electrode assembly 100 includes cathode plates 200 having cathode tabs 300 the protruding lengths of which are different. The respective cathode tabs 300 protrude from cathode current collectors 210 while a cathode active material 220 is not applied to the respective cathode tabs 300.

The cathode plates 200 are stacked in a structure in which a cathode plate 202 having a cathode tab 302, the protruding length of which is the smallest is located at the lowermost position, and a cathode plate 201 having a cathode tab 301, the protruding length of which is the largest is located at the uppermost position, such that the protruding lengths of the cathode tabs 300 are gradually increased from the lowermost position to the uppermost position. At this time, a cathode lead 400, which is joined to the cathode tabs 300, is located adjacent to the bottom of the cathode tab 302 protruding from the cathode plate 202 located at the lowermost position. Consequently, the cathode tabs 300 are brought into tight contact with each other in the direction in which the cathode lead 400 is located such that the cathode tabs 300 are joined to each other with the minimum bending length. This structure is more clearly illustrated in FIG. 4, which is a partially enlarged view typically illustrating the joint portion between the cathode tabs and the cathode lead.

Figure 4:
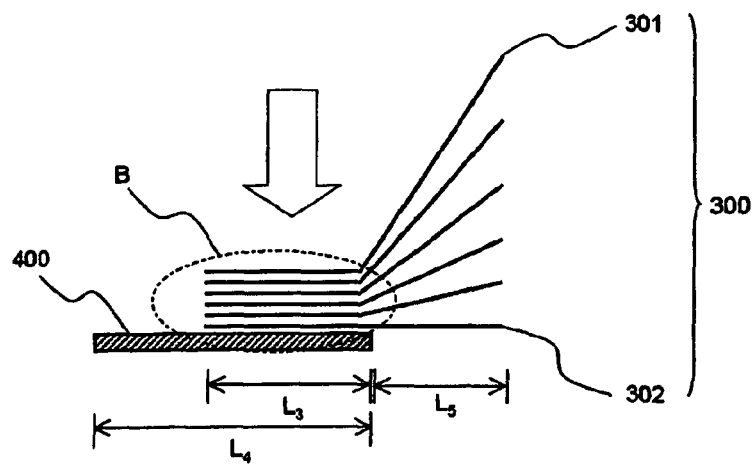
FIG. 4 is an enlarged view illustrating the connection between cathode tabs, joined to each other in a concentrated state, and a cathode lead of the electrode assembly shown in FIG. 3.

Referring to FIG. 4, the cathode tabs 300 are brought into tight contact with each other in the direction indicated by an arrow, and are then connected to the cathode lead 400. At this time, the cathode tab 302, located at the lowermost position, is little bent, and the bending angle is gradually increased toward the cathode tab 301, located at the uppermost position. Consequently, the cathode tabs 300 have the same joint length $L_3$ at a joint portion B due to the difference between the bending angles, although the cathode tabs 300 have different protruding lengths.

Figure 1:
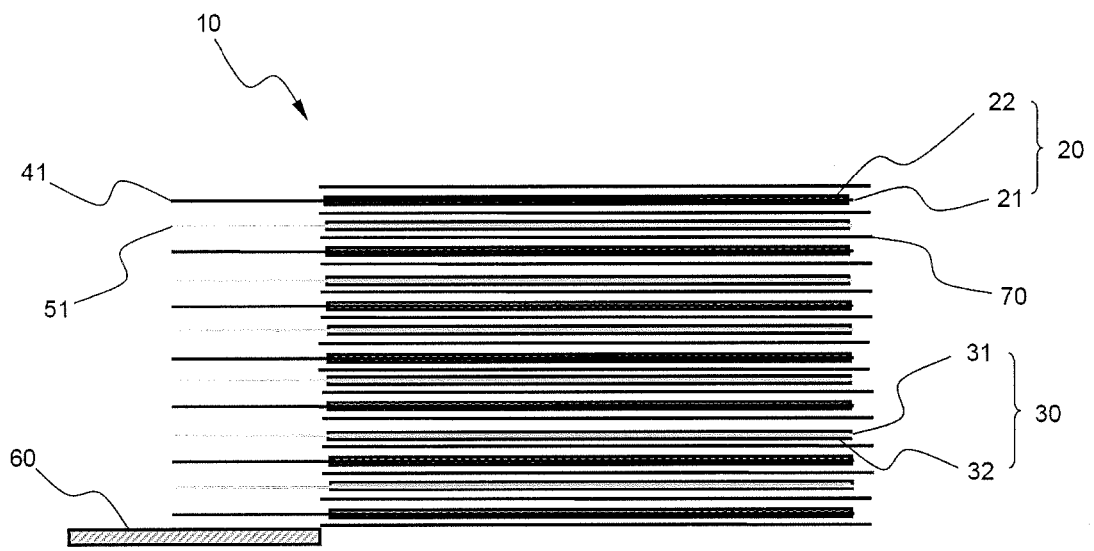
FIG. 1 is a typical view illustrating the general structure of a conventional stacking type electrode assembly.
Figure 2:
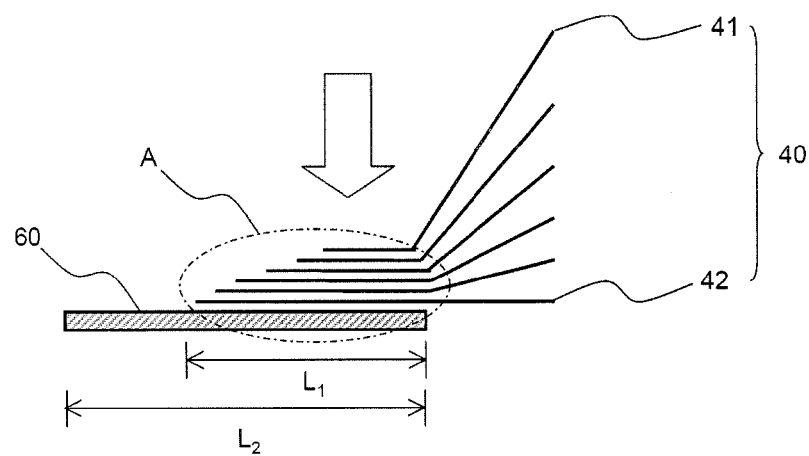
FIG. 2 is an enlarged view illustrating the connection between cathode tabs, joined to each other in a concentrated state, and a cathode lead of the electrode assembly shown in FIG. 1.

The joint length $L_3$ corresponds to the length of the lowermost cathode tab 302, which is little bent. Consequently, the joint length $L_3$ is less than the joint length $L_1$ set based on the lowermost cathode tab 42 having the largest length at the joint portion A, as shown in FIG. 2. As a result, the length $L_4$ of the cathode lead, corresponding to the joint length $L_3$ of the cathode tabs 300, is also less than the length $L_2$ of the cathode lead as shown in FIG. 2.

On the other hand, the cathode tabs 300 are bent based on the lowermost cathode tab 302, which is little bent, and therefore, the cathode tabs 300 have the smallest bending length $L_5$.

Hereinafter, examples of the present invention will be described in more detail. It should be noted, however, that the scope of the present invention is not limited by the illustrated examples.

EXAMPLE 1

A cathode active material containing lithium and an anode active material containing graphite were applied to opposite major surfaces of an aluminum foil and a copper foil, respectively, and then the aluminum foil and the copper foil were cut such that tab parts, of the cut aluminum foils and the cut copper foils, to which the active materials were not applied, had gradually increased lengths. Subsequently, the cut aluminum foils and the cut copper foils were stacked using separators in the structure shown in FIG. 3. After that, the tab parts of the cut aluminum foils and the cut copper foils were brought into tight contact with each other, as shown in FIG. 4, in the direction in which the cut aluminum foils and the cut copper foils were stacked, and were connected to corresponding electrode leads to manufacture an electrode assembly.

COMPARATIVE EXAMPLE 1

An electrode assembly was manufactured in the same method as Example 1 except that the aluminum foil and the copper foil were cut such that tab parts, of the cut aluminum foils and the cut copper foils, to which the active materials were not applied, had the same length.

The tab ends of the electrode assembly manufactured according to Example 1 and Comparative example 1 were observed, using a microscope, to inspect the surface state thereof. The observation results revealed that burrs were formed at the cut ends of the electrode assembly according to Comparative example 1, the electrode tabs of which were cut with the same length. As previously described, the burrs damage the corresponding regions of the battery case, during the assembly or the use of a battery, with the result that a short circuit may occur in the battery or an electrolyte may leak from the battery.

INDUSTRIAL APPLICABILITY

As apparent from the above description, the electrode assembly according to the present invention has the following effects. The electrode assembly is constructed in a structure in which the lengths of electrode tabs at a joint portion between the electrode tabs and an electrode lead are the same while the bending of the electrode tabs is minimized. Furthermore, the electrode assembly is constructed in a structure in which the joining between the electrode tabs and the electrode lead is stably performed while the size of the electrode lead is small.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A stacking or stacking and folding type electrode assembly of a cathode/separator/anode structure comprising:
   at least one electrode plate;
   electrode tabs extending between first ends and second ends, the electrode tabs having no active material applied thereto and being coupled to the at least one electrode plate at the first ends; and
   at least one electrode lead electrically coupled to the electrode tabs at the second ends;
   wherein the at least one electrode lead and the electrode tabs are coupled to form a joint portion and lengths of the electrode tabs are increased from an electrode tab closest to the at least one electrode lead to an electrode tab farthest from the at least one electrode lead such that the joint portion has a first length, and wherein the at least one electrode plate and the at least one electrode lead are spaced apart by a horizontal distance, the first length being larger than the horizontal distance.

2. The electrode assembly according to claim 1, wherein each of the at least one electrode lead is made of a metal plate.

3. The electrode assembly according to claim 2, wherein the metal plate is selected from a group consisting of an aluminum plate, a copper plate, a nickel plate, a copper plate coated with nickel, and a SUS plate.

4. An electrochemical cell including an electrode assembly according to claim 1.

5. The electrochemical cell according to claim 4, wherein the electrochemical cell is a secondary battery or a capacitor.

6. The electrochemical cell according to claim 5, wherein the secondary battery is constructed in a structure in which an electrode assembly is mounted in a battery case made of a laminate sheet including a metal layer and a resin layer in a sealed state.

7. The electrochemical cell according to claim 6, wherein the secondary battery is a unit cell for battery packs.

* * * * *